Patented Oct. 10, 1933

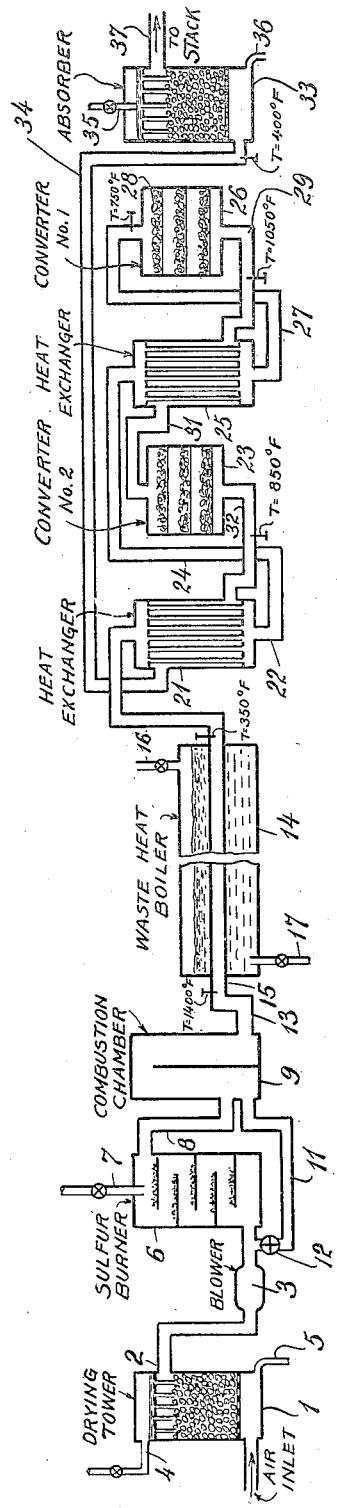

1,930,125

UNITED STATES PATENT OFFICE 1,930,125

CONTACT PROCESS FOR THE MANUFACTURE OF SULPHURIC ANHYDRIDE

Theodore V. Fowler, Jr., Pelham, N. Y., assignor to General Chemical Company, New York, N. Y., a corporation of New York Application September 22, 1927
Serial No. 221,349

6 Claims. (Cl. 23—176)

This invention relates to the contact process for the manufacture of sulphuric acid. The invention has for its object the provision of a process of this type characterized by practically complete utilization of the available heat generated in the system.

The new process is carried out in apparatus which is diagrammatically set forth in the drawing. In this drawing 1 represents a drying tower for drying the air used in the system by contact with sulphuric acid. The air is drawn from the atmosphere into the tower through the air inlet, passes up through the tower in contact with a stream of strong sulphuric acid descending over suitable packing, and passes out at the gas outlet 2 whence it is conducted to blower or compressor 3. The drying acid circulated through the tower enters through inlet 4, is distributed over the packing by a suitable distributing plate, and is drawn off at outlet 5 in the customary manner. The dried air is forced by blower 3 into sulphur burner 6 which may be any form of brimstone burner adapted to operate under positive pressure. In the drawing I have shown a shelf type of burner similar to a Vesuvius burner into which molten sulphur of the Louisiana brimstone type is introduced at the top through line 7. The sulphur drains downwardly from shelf to shelf until it is consumed by the stream of air passing upwardly therethrough. The gas from the sulphur burner, which will contain sulphur dioxide and a considerable proportion of unburned sulphur vapor, passes through conduit 8 to combustion chamber 9. A portion of the air from the blower is bypassed through line 11 controlled by valve 12 into the combustion chamber to provide sufficient oxygen to completely burn any sulphur vapor carried along with the sulphur dioxide gas from the sulphur burner, and to provide a sufficient excess of free oxygen in the gases for the subsequent catalytic conversion reaction.

The strength of the sulphur dioxide gas produced in combustion chamber 9 may be varied by increasing or decreasing the amount of air bypassed through line 11, but for the purposes of the present invention I prefer to produce a relatively strong gas containing for example in the neighborhood of 10 to 12% $SO_2$ because of the greater temperatures and amount of heat generated when producing relatively strong gas rather than weaker gas. The temperature reached in the combustion chamber will be quite high and under proper operating conditions will be as high as 1400 to 1500° F. The gases may not, however, be passed to the converters at this temperature but must be materially cooled to a temperature of approximately 750° F. in order that a high conversion efficiency may be obtained. To accomplish this cooling in a convenient manner and at the same time to make use of the large quantity of surplus available heat contained in the hot gas I pass the gas from the combustion chamber through conduit 13 into a waste heat boiler represented by numeral 14. This boiler may comprise as shown a boiler shell through which one or more relatively large tubes or conduits 15 extend, the outer surfaces of the tubes being in contact with water or other suitable cooling medium confined within the boiler. The heat transferred to the water from the hot gas will generate steam under pressure which is withdrawn through line 16, while fresh water may be fed into the boiler through feed water line 17. The gas issuing from the boiler will preferably have a temperature of about 350°–400° F. depending on the efficiency of the heat transfer from the gas to the water and the temperature of the water or the steam pressure maintained within the boiler, which under the conditions noted may be about 75–100 lbs. per sq. in.

The temperature of the gas issuing from the waste heat boiler is materially below the temperature required in the gas for the subsequent conversion reaction and hence I provide means for reheating the gas back to conversion temperature. The cooled gas which has now had practically all of the heat available for the production of useful energy abstracted therefrom should be reheated and, for this purpose, it enters a suitable heat exchanger 21 at the top thereof and passes through a series of tubes within the heat exchanger to outlet 22. The outer surfaces of the tubes within the heat exchanger are in contact with hot gas issuing from converter No. 2, and in the system illustrated using but two converters, the final converted 23 of the system. The cold $SO_2$ gas is thereby reheated several hundred degrees F. in passing through the heat exchanger and will reach a temperature of approximately 500° F. at outlet 22. This gas then passes through conduit 24 to the inlet at the top of a second heat exchanger 25. In heat exchanger 25 the temperature of the $SO_2$ gas is raised further by transfer of heat from the hot partially converted gas issuing from the first converter 26 and will attain the desired converting temperature of 750° F. at the outlet of the heat exchanger. The gas thus reheated to proper converting temperature passes through conduit 27 to the first converter 26 wherein it contacts with catalytic material 28 carried on trays or shelves within the shell of the converter. This catalytic material preferably consists of platinum carried upon a suitable base such as asbestos fibre. The catalyst causes the interaction of the sulphur dioxide and free oxygen contained in the gas to take place forming $SO_3$ (sulphuric anhydride). This reaction is highly exothermic and consequently the temperature of the gas will increase considerably in passing through the converter and will rise to about 1050° F., although this latter temperature may vary considerably depending upon the strength of $SO_2$ employed and the degree of conversion obtained in the converter. The hot, partially converted gas issuing from converter 26 then passes through conduit 29 into heat exchanger 25 wherein it contacts with the outer surfaces of the heat transfer tubes, through which sulphur dioxide gas is passing as previously explained, and thus gives up a portion of its heat to such gas. The degree of cooling taking place in heat exchanger 25 is regulated to produce a proper converting temperature of 750° F. in the $SO_3$ gas leaving the heat exchanger through conduit 31. This gas then enters the top of converter 23 and is therein again contacted with platinum catalyst to carry the conversion of $SO_2$ to $SO_3$ to substantial completion. I prefer to obtain an over-all conversion of 96 to 98%.

It is to be understood that exact regulation of the temperatures prevailing throughout the converter-heat exchanger system may be obtained by providing suitable by-pass lines (not shown) for the gas and by varying the amount of heat insulation upon the apparatus as is well known in the art.

The temperature of the gas is again raised in passing through converter 23 and will reach approximately 850° F. This temperature is much too high for the following absorption step and hence to make use of this available heat the hot converted $SO_3$ gas is passed through conduit 32 into and through heat exchanger 21 wherein it gives up its heat to the incoming relatively cold $SO_2$ gas and is thus cooled to the proper temperature for entering absorber 33, which temperature will ordinarily be about 400° F. The cooled $SO_3$ gas passes from heat exchanger 21 to absorber 33 through line 34. The absorber may be constructed in the usual manner and as shown consists of a tower provided with suitable packing over which concentrated sulphuric acid is circulated. The acid is introduced at inlet 35, distributed to the packing by a suitable distributing plate, and withdrawn through outlet 36. The $SO_3$ gas passes upwardly through the tower, is absorbed in the circulating acid and the residual gases pass to the stack through gas outlet 37.

In operating the process the type of brimstone introduced into the sulphur burner must be such as will produce a sulphur dioxide gas of sufficient purity that it may be passed as shown directly without wet purification to the platinum catalyst contained in the converters without resulting in "poisoning" of the catalyst. By specifying that the gas must be capable of being passed directly to the catalyst I do not mean to exclude such operations as filtering of the gas while hot to remove dust and like impurities, which operations will result in but slight lowering in temperature of the gas, but I do intend to exclude such purification as scrubbing of the gas by contact with scrubbing liquid, and like operations characteristic of various known wet purification processes. As examples of brimstone satisfying the above conditions of purity I may give Louisiana, Texas or Freeport brimstone, which are quite low in arsenic and produce a very pure sulphur dioxide gas. It is to be understood, however, that the invention is not confined to the specific sources of sulphur mentioned, but that any source of sulphur may be used capable of producing a sulphur dioxide gas which will not poison the particular catalyst employed. Likewise, while I have specified platinum as the preferred catalyst, other catalysts capable of causing substantially complete conversion of the $SO_2$ to $SO_3$ may be employed. For example, when using catalysts of the vanadium type the sulphur dioxide gas produced need not be as pure as when employing platinum because the vanadium catalyst is not nearly so susceptible to poisoning by arsenic and like impurities.

The temperature to which the $SO_2$ gas may be lowered in the waste heat boiler will depend considerably upon the degree of drying of the air in the drying tower, because the degree of drying of the air will determine to a large extent the amount of moisture or water vapor present in the $SO_2$ gas. The minimum temperature to which the gas is cooled should in normal operation be maintained above that temperature at which sulphuric acid will form from the combination of the moisture in the gas with the small amount of $SO_3$ produced in the sulphur burner. This temperature will vary, as above explained, with the degree of drying and with proper operation of the drying tower may be carried somewhat lower than 350° F. as specified. I prefer not to attempt to cool much below 350° F. in the waste heat boiler because this is practically the lowest temperature which may be maintained and still produce steam under a substantial pressure. Under the specific operating conditions given, I find that I can generate substantial quantities of steam under a pressure of about 75–100 pounds per square inch.

It will be seen that my process provides for the utilization of practically all of the available heat generated in the system. The exceedingly large amount of heat generated in the combustion of the brimstone is recovered in available form as steam and may be used either directly for running the blowers, pumps, etc. of the system or may be converted into electric energy and used in this form. A large saving in expenditure for power is thus obtained and material economies effected in the operating expense of the system. Any excess steam may be utilized for heating purposes or for the production of power to be used in connected processes. The large amount of heat generated in the conversion of the $SO_2$ to $SO_3$ is likewise made use of to reheat the cooled $SO_2$ gas after the available heat has been extracted therefrom, and to maintain proper temperatures throughout the conversion reaction.

By the foregoing procedure the thermal control of the system as a whole in its various parts is a function of the utilization of practically all of the available heat generated in the system. Thus fluctuations in the temperature of the gases leaving the initial combustion chamber may be reduced to a constant temperature below that required for efficient conversion in the converters, whereas by proper arrangement and control of the heat exchangers, or by using by-pass connections or the like, a definite predetermined constant temperature may be provided for with respect to the gases at their point of entry into any one of the converters, which temperature at said points of entry will be that which is most favorable to the ensuing catalytic conversion.

I claim:

1. The improvement in the method of making sulphuric anhydride by the contact process which comprises producing hot sulphur dioxide gas having a temperature above converting temperature and of a purity such that it may be passed directly to the catalyst employed in the process without poisoning the catalyst, cooling the gas to a temperature below converting temperature but above the condensation temperature of sulphuric acid from said gas, conserving heat abstracted from the hot gas during the cooling operation by passing the gas in heat transfer relation with a fluid cooling medium, reheating the cooled gas to converting temperature, contacting the reheated gas with a catalyst to convert the sulphur dioxide to sulphuric anhydride, and utilizing the heat generated in the conversion reaction to reheat the cooled gas as aforesaid.

2. The improvement in the method of making sulphuric anhydride by the contact process which comprises producing hot sulphur dioxide gas by the combustion of brimstone with dried air, said gas having a temperature above converting temperature and being of a purity such that it may be passed directly to the catalyst employed in the process without poisoning said catalyst, cooling the hot gas to a temperature below converting temperature but above the condensation temperature of sulphuric acid from said gas, generating steam under pressure while cooling said hot gas, by transfer of heat from said gas to water under pressure, reheating the gas, after cooling to a temperature below converting temperature, to converting temperature, and contacting the reheated gas with a catalyst to convert the sulphur dioxide to sulphuric anhydride, and utilizing the heat generated in the conversion reaction to reheat the cooled gas as aforesaid.

3. The improvement in the method of making sulphuric anhydride by the contact process which comprises producing hot sulphur dioxide gas having a temperature above converting temperature by the combustion of brimstone, cooling said hot gas to a temperature below the requisite temperature for conversion and above about 350° F., generating available energy by transferring heat abstracted from the hot gas during the cooling operation to a confined cooling medium, then reheating the cooled gas to conversion temperature, contacting the reheated gas with a catalyst to convert the sulphur dioxide to sulphuric anhydride, and utilizing the heat generated in said conversion reaction as the means for reheating the cooled gas to conversion temperature as aforesaid.

4. The improvement in the method of making sulphuric anhydride by the contact process which comprises producing sulphur dioxide gas having a temperature of substantially 1400° F. by the combustion of brimstone of the Louisiana type with dried air, cooling the hot gas to a temperature within the range of about 350° F. to 400° F. by passing said hot gas in heat transfer relation to water confined under pressure, reheating the cooled gas to substantially 750° F. by passing said cooled gas in heat transfer relation to hot gas which has undergone conversion, and passing the reheated gas in contact with a platinum type catalyst to convert the sulphur dioxide to sulphur anhydride.

5. The improvement in the method of making sulphuric anhydride by the contact process which comprises producing sulphur dioxide gas having a temperature above converting temperature and of a purity such that it may be passed directly to the catalyst employed in the process without poisoning said catalyst, then cooling said hot gas to a temperature below the requisite temperature for conversion and above about 350° F., conserving heat abstracted from the gas during the cooling operation, then reheating the cooled gas to the proper conversion temperature, contacting the reheated gas with the catalyst to convert the sulphur dioxide to sulphuric anhydride and utilizing the heat generated in said conversion reaction as the means for reheating the cooled gas to the proper conversion temperature as aforesaid.

6. The improvement in the method of making sulphuric anhydride by the contact process which comprises producing hot sulphur dioxide gas having a temperature above converting temperature and of a purity such that it may be passed directly to the catalyst employed in the process without poisoning the catalyst, cooling the gas to a temperature below converting temperature but above the condensation temperature of sulphuric acid from said gas, conserving substantially all of the heat abstracted from the hot gas during cooling thereof to said temperature below converting temperature by passing the gas in heat transfer relation with a fluid cooling medium, reheating the cooled gas to converting temperature, contacting the reheated gas with a catalyst to convert the sulphur dioxide to sulphuric anhydride, and utilizing the heat generated in the conversion reaction to reheat the cooled gas as aforesaid.

THEODORE V. FOWLER, Jr.